United States Patent [19]
Allread

[11] 4,445,664
[45] May 1, 1984

[54] AXIAL FORCE OPERATED BALL VALVE
[75] Inventor: Alan R. Allread, Jackson, Mich.
[73] Assignee: Aeroquip Corporation, Jackson, Mich.
[21] Appl. No.: 314,754
[22] Filed: Oct. 26, 1981
[51] Int. Cl.³ .......................................... F16L 37/06
[52] U.S. Cl. .............................. 251/149.2; 251/149.4; 251/149.6
[58] Field of Search ............... 251/149.2, 149.4, 149.5, 251/149.6, 149.9; 137/614.02, 614.03, 614.06

[56] References Cited
U.S. PATENT DOCUMENTS

| | | | |
|---|---|---|---|
| 3,078,068 | 2/1963 | Romney | 251/149.2 |
| 3,276,474 | 10/1966 | Gill | 137/614.03 |
| 3,423,063 | 1/1969 | Germun | 251/149.9 |
| 3,618,892 | 11/1971 | Sciuto, Jr. | 251/149.2 |
| 4,181,149 | 1/1980 | Cox | 251/149.2 |

Primary Examiner—A. Michael Chambers
Attorney, Agent, or Firm—Beaman & Beaman

[57] ABSTRACT

The invention pertains to a self-sealing conduit fitting of the ball valve type. A spherical ball valve having a diametrical bore is pivotally supported within a fitting passage and operated by a pivot axis eccentrically related to the valve center. The pivot is restrained against axial movement, but is radially displaceable, and biasing means within the fitting body bias the ball valve axially into engagement with an annular valve seat also capable of axial displacement within the fitting. The ball valve pivot causes the ball valve to rotate between opened and closed positions upon axial displacement of the ball valve by its valve seat, or under the influence of the biasing means. Stop means determining the axial position of the valve seat maintains the ball valve in a closed condition when the fitting is disconnected.

7 Claims, 6 Drawing Figures

AXIAL FORCE OPERATED BALL VALVE

BACKGROUND OF THE INVENTION

Fluid couplings and fittings are widely employed to interconnect components of conduit systems. For instance, self-sealing valved couplings are often utilized at the ends of hose lines wherein uncoupling of the mating parts automatically causes valve components within the parts to close to prevent fluid leakage. Assembly of the coupling parts automatically opens the valves to reestablish fluid flow between the coupling parts.

Self-sealing couplings and fittings commonly employ axially moveable valves of the sliding sleeve or poppet type which utilize the relative axial movement of the coupling parts during assembly or disassembly to open or close the valves, respectively. Poppet and sleeve type valves usually include ports and flow paths having an axis which is perpendicularly or transversely disposed to the axis of the associated fitting passage, and due to the torturous flow path through or around the valve considerable resistance to fluid flow is produced. Further, high turbulence is created due to the fluid rapidly changing direction during flow through the fitting, and pressure losses may be significant. Sleeve and poppet valves often utilize springs to bias the valves toward the closed condition, and while valves of this type are capable of automatic operation controlled by the assembly and disassembly of the coupling parts the adverse fluid flow characteristics have been tolerated as alternate constructions were not available which were practical and dependable in operation, particularly with respect to the automatic self-sealing feature.

Ball valves employing a spherical ball element having a large diametrical flow passage bore are used in conduit systems wherein high capacity, low flow resistance characteristics are required. As the bore within a ball valve is often of a diameter equal to the passage within the associated fitting, the valve, itself, offers little restriction to fluid flow, and as only a 90° rotation of the ball valve is required between full open and closed positions such valves are quick acting. However, ball valves usually require an external operator, such as a lever or handle, for rotating the ball valve between open and closed positions, and ball valves have not been readily adapted to self-sealing coupling use wherein the ball valve element must pivot between open and closed conditions depending on whether the coupling parts are connected or disconnected. Preferably, self-sealing valved fittings are fully automatic wherein the valve operation is solely determined by the coupling and uncoupling action of the parts, and no manual valve operation is necessary.

It is an object of the invention to provide a self-sealing fitting utilizing a ball valve which is automatically displaced between open and closed conditions solely by the act of coupling and uncoupling the fitting to other parts of the flow system.

Another object of the invention is to provide a self-sealing fitting for controlling fluid flow utilizing an automatically operated ball valve wherein the ball valve is operated between open and closed conditions solely by axial forces imposed thereon during coupling and uncoupling of the fitting.

A further object of the invention is to provide a self-sealing fitting utilizing a ball valve which produces little restriction to fluid flow through the valve, and wherein the ball valve is rotated between open and closed conditions by the act of coupling the fitting to another fitting, or the uncoupling thereof, respectively, axial forces imposed upon the ball valve determining the rotation of the valve between its open and closed conditions.

Yet another object of the invention is to provide a self-sealing fitting utilizing a ball valve having a pivot offset with respect to the ball center and bore, such that axial displacment of the ball valve within the fitting passage while axially restraining the pivot causes the ball valve to rotate between open and closed conditions solely due to its axial displacement.

In the practice of the invention the fitting body includes a passage through which fluid flow occurs. A ball valve is located within the passage having an exterior spherical surface and a diametrical bore of a diameter substantially equal to the fitting passage. The ball valve includes pivot pins extending from the spherical surface defining an operating pivot axis which is off-set relative to the center of the ball valve and relative to the valve bore. An annular groove defined within the passage receives the pivot pins restraining the same against passage axial displacement, but permitting rotation and radial displacement of the pivot.

An annular valve seat is slidably displaceable within the fitting passage and is sealed with respect to the passage by a seal ring engaging a cylindrical surface. The valve seat also includes an annular seal sealingly engaging the spherical exterior surface of the ball valve, and the valve seat bore is of a diameter substantially equal to the ball valve bore. An annular collar is located in the fitting passage upon the opposite side of the ball valve with respect to the valve seat and is also axially displaceable, and a compression spring biases the collar into engagement with the ball valve and biases the ball valve into engagement with the valve seat. Axial displacement of the collar, ball valve and valve seat is limited by a stop defined within the fitting passage. An internal thread is concentrically formed within the passage adjacent the valve seat stop for receiving a conduit adapter which couples with the fitting.

The support of the ball valve by the valve seat and collar permits the ball valve to rotate within the fitting passage solely by axial forces being imposed upon the ball valve through its associated valve seat or collar. Such axial forces rotate the ball valve due to the offset position of the valve pivot wherein a torque is imposed upon the ball valve during axial displacement thereof and the valve will rotate while its center remains coincident with the fitting passage axis.

The biasing force imposed upon the ball valve by the spring biases the ball valve toward the fitting "open" end until the valve seat engages its stop. Under this condition the valve bore will be perpendicularly disposed to the axis of the fitting passage, and in this condition the valve seat will not communicate with the valve bore and the fitting passage is closed with respect to fluid flow therethrough. This is the normal uncoupled condition of the fitting.

Upon the coupling of another fitting, adapter or other coupling half to the fitting by means of an annular stem engaging the passage threads the valve seat is engaged and axially displaced away from its stop compressing the collar spring. This axial movement of the valve seat, ball valve and collar causes the ball valve to rotate due to the rotational force imposed on the ball valve by the pivot, and upon full connection of the fitting with its associated coupling part the ball valve will have rotated 90° to align the valve bore with the fitting passage to "open" the passage to full unrestricted flow. Removal of the associated fitting by unthreading the stem permits the spring to move the collar, ball valve and valve seat toward the stop pivoting the ball valve toward its closed condition such that complete uncoupling results in the ball valve being fully closed and the fitting is "self-sealed".

From the above description, it will be appreciated that rotation of the ball valve between open and closed conditions is solely produced by axial forces imposed upon the ball valve by its valve seat or biasing collar.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
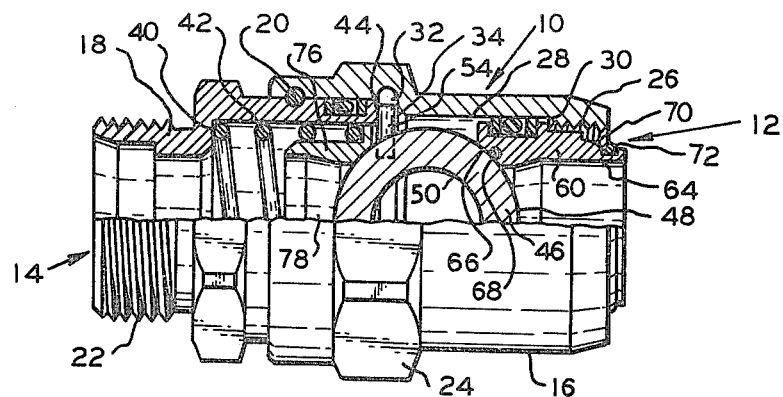
FIG. 1 is an elevational view, partially sectioned, illustrating a fitting in accord with the invention, the ball valve being illustrated in the closed condition.

In the drawings a single self-sealing fitting 10 is illustrated, and this fitting may be connected to the end of a flexible hose or a stationary component of a conduit system, it being understood that the fitting 10 can be utilized in the known manner of any self-sealing fitting or coupling. The fitting including an "open" end 12 to which other components of the conduit system may be attached, and the end 14 constitutes the "closed" end of the fitting associated with a hose, elbow, pipe, or other conduit system component which is pressurized or in communication with the medium to be controlled.

The fitting body is defined by an outer annular portion 16 and inner annular portion 18 interconnected by a drive wire 20 inserted within annular aligned grooves within the portions 16 and 18 in the known manner. The portion 18 is provided with exterior threads 22 for connection to the associated hose or conduit component and the portion 16 is formed with wrench flats 24 for receiving a wrench.

The body portion 16 includes a concentric passage and the passage is internally threaded at 26. A cylindrical surface 28 is formed within the passage adjacent the threads 26, and a stop shoulder 30 is radially defined at the transition between the threads and surface 28. An annular groove 32 is formed within the portion 16 and is partially defined by a radial surface 34 lying within a plane perpendicular to the axis of the portion 16.

The body portion 18 includes sealing means 36 interposed between the portions 16 and 18 to establish a fluid seal therebetween, and internally, the portion 18 defines passage 38. A shoulder surface 40 constitutes an anchor for the compression spring 42, as later described, and the inner end surface 44 of the portion 18 lies in a plane perpendicular to the axis of the fitting and is in spaced parallel relationship to the surface 34 of portion 16 and forms a portion of the groove 32.

The valving element comprises a ball valve 46 located within the fitting passage rotatable through 90° between open and closed positions. The ball valve 46 includes a spherical outer surface 48, and is provided with an internal diametrically related cylindrical bore 50 which is concentric with the center of the ball valve. The diameter of the bore 50 is substantially equal to the effective fluid flow diameter through the fitting so that the ball valve does not create a restriction to fluid flow.

The ball valve 46 is provided with a pivot 52 which is defined by a pair of coaxial pivot pins 54 received within blind holes drilled in the ball valve intersecting the exterior surface 48. The pins 54 project from the ball surface a sufficient distance to permit their outer ends to be received between the surfaces 34 and 44 defining the groove 32, as will be apparent from FIGS. 1-4.

Figure 5:
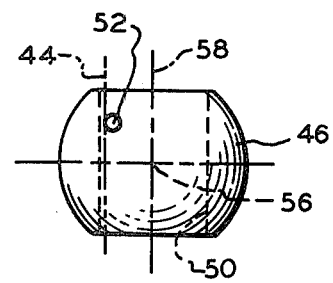
FIG. 5 is a top plan, schematic view of the ball valve and its pivot showing the valve in the closed condition.
Figure 6:
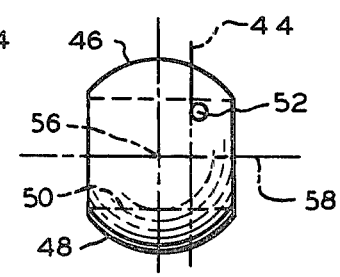
FIG. 6 is a top plan, schematic view similar to FIG. 5, and in alignment therewith, illustrating the ball valve and its pivot when in the open condition.

The location of the axis of the pivot 52 defined by pins 54 is of significance in producing the desired control of the ball valve. As best appreciated from FIGS. 5 and 6, the pivot pins 52 are located such that the pivot axis is offset with respect to the center 56 of the ball valve, and is also offset with respect to the axis 58 of the valve bore 50. The pivot axis is preferably perpendicular to the axis of the bore 50, and lies within a plane obliquely intersecting the valve bore axis 58 at a 45° included angle. The radial distance of the pivot axis from the ball center is such to provide a sufficient torque arm to permit the ball valve to rotate under relatively small axial forces imposed upon the valve, but this distance is not so great as to require excessive axial displacement of the ball valve to cause pivoting between its open and closed conditions. It is to be understood that the pivot 52 functions as a crank or lever arm to rotate the ball valve, and that the ball valve 46 does not rotate relative to the pivot 52.

An annular valve seat 60 is received within the passage of portion 16 in alignment with the cylindrical surface 28, and the valve seat is axially displaceable within the surface 28 and sealed thereto by O-ring seal assembly 62 which engages surface 28. The valve seat includes an internal passage bore 64, and is provided with a spherical segment surface 66 which engages the valve surface 48, and includes an annular groove for receiving O-ring 68. Adjacent its outer end the valve seat 60 includes a tapered surface 70 adjacent the seal ring 72 for engagement by the valve actuating element, as later described. Also, a radial stop shoulder 74 is formed on the valve seat facing shoulder 30.

An annular collar 76 engages the ball valve 46 on the opposite side of the valve with respect to the valve seat 60. The collar includes a bore passage 78, and spherical segment surface 80 engages the valve surface 48. The collar 76 is externally recessed to provide clearance for receiving the compression spring 42, and one end of the compression spring engages the collar radial shoulder 82, while the other spring end engages the body portion surface 40. Accordingly, it will be appreciated that the spring 42 exerts a continuous axial biasing force on the collar 76, ball valve 46, and valve seat 60 toward the right, FIGS. 1 and 2. Movement of the valve seat 60 to the right is limited by engagement of the valve seat stop shoulder 74 with the stop shoulder 30, as apparent in FIG. 1.

The axial dimension of the groove 32 as defined by surfaces 34 and 44 is slightly greater than the diameter of the pivot pins 54 wherein the pivot pins are capable of rotation within the groove 32, and may also be laterally radially displaced therein during ball valve rotation. The groove 32 will maintain the pivot 52 perpendicular to the axis of the fitting at all times, and rotational displacement of the pivot about the fitting axis does not affect the operation of the ball valve.

From the aforedescribed structural relationships it will be appreciated that the biasing force imposed upon the ball valve in the axial direction of the fitting passage by the collar 76 and spring 42 will cause a rotation of the ball valve about its center 56 and relative to the fitting axis. As both the collar and valve seat are capable of axial displacement within the fitting, and as the ball valve is capable of rotating relative to the collar and valve seat, axial displacement of the ball valve causes a torque to be imposed upon the ball valve due to the fact that the pivot pins 54 are restrained against axial movement within the groove 32. The pivot 52 is so located upon the ball valve 46, and the stop shoulders 30 and 74 are so related to the significant dimensions of the ball valve and pivot that, in the normally closed position shown in FIG. 1, the ball valve 46 will have rotated such that the axis of the bore 50 is disposed at 90° to the axis of the fitting, as shown in FIG. 1, and represented in FIG. 5. In this closed position the bore 50 will not communicate with the valve seat bore 64 and flow through the fitting is prevented.

Opening of the fitting is automatically achieved by connecting the fitting to another component of the conduit system capable of exerting an axial force upon the valve seat and ball valve. In the preferred arrangement this axial force is produced by a conduit member threaded onto threads 26. A typical conduit connection is shown in FIG. 2 wherein an adapter 84 has been threaded onto threads 26.

The adapter 84 may constitute a portion of a hose fitting, or a stationary component of the conduit system wherein, by threads 86, it is attached to a hose nipple or other conventional conduit system component. The adapter includes wrench flats 88, is internally provided with a passage 90, and includes an externally threaded neck or stem 92 for mating with the threads 26. The nose of the neck 92 is formed with an oblique surface which engages the valve seat surface 70, and cylindrical surface 94 is engaged by seal 72.

Figure 2:
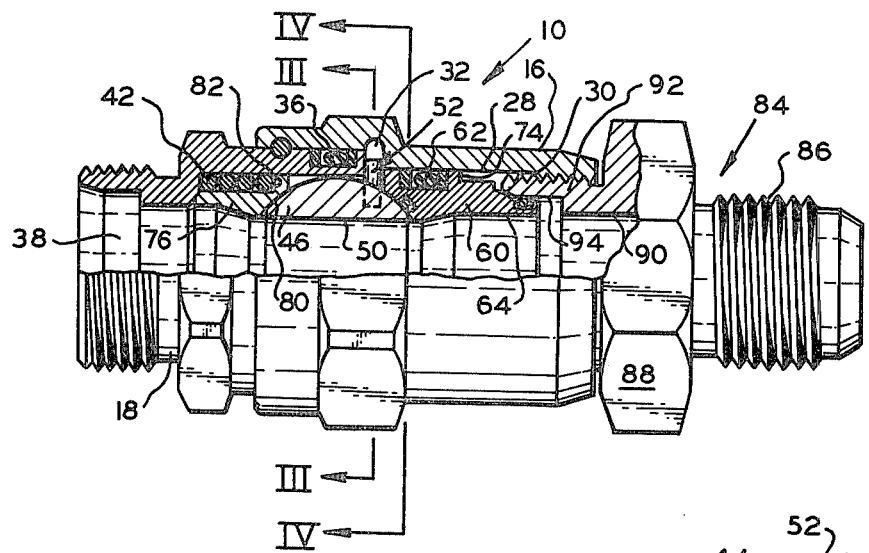
FIG. 2 is an elevational view of a fitting in accord with the invention, partially sectioned, illustrating a conduit adapter associated with the fitting in a fully coupled relationship and wherein the ball valve is in the full open condition.
Figure 3:
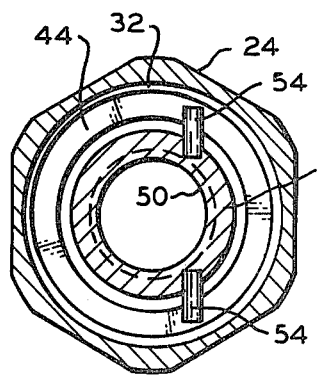
FIG. 3 is an elevational, sectional view illustrating the ball valve as taken along Section III—III of FIG. 2.
Figure 4:
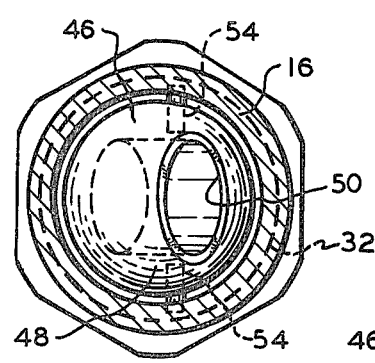
FIG. 4 is an elevational, sectional view along Section IV—IV of FIG. 2 but illustrating the ball valve in elevation and partially opened, and omitting the valve seat for purpose of illustration.

Upon threading the adapter neck 92 onto threads 26 the engagement of the adapter and valve seat surface 70 will displace the valve seat 60 toward the left, FIG. 2, as the adapter 84 is threaded into the fitting 10. This axial displacement of the valve seat to the left, also displaces ball valve 46 and collar 76 compressing spring 42. As the surface 44 of groove 32 prevents the pivot pins 54 from axial displacement within the fitting is applied to the ball valve 46 as it moves to the left causing relative rotation with respect to the valve seat 46 and collar 76. The length of the adapter neck 92 is such that sufficient rotation of the ball valve occurs to rotate the valve from the closed position of FIG. 1 to the fully open position shown in FIGS. 2 and 6 wherein the bore 50 is in axial alignment with the axis of the fitting. As the diameter of the valve bore 50 substantially corresponds to the diameters of the valve seat bore 64 and collar bore 78 flow through the fitting 10 is essentially unrestricted when the ball valve is in the fully open position, and the pivoting of the ball valve from the closed to the open position is automatically achieved merely by the connection of the fitting 10 to the adapter 84 and the utilization of the relative axial displacement of these components during coupling.

When the fitting 10 and adapter 84 are uncoupled the spring 42 will force the collar 76, valve 46 and valve seat 60 to the right as the adapter neck is retracted from the fitting, and such movement will pivot the ball valve 46 toward the closed condition shown in FIG. 1 upon the adapter 84 being completely uncoupled from the fitting 10.

The biasing force produced by the spring 42 assures that a sealed connection between the ball valve and valve seat 60 occurs at all times regardless of whether the system is under pressure when the valve is closed. Further, the positive engagement between the valve seat and ball valve exterior surface, and the sealing between the valve seat and the body portion 16, assures a leakproof fitting capable of withstanding high internal pressures.

It is to be appreciated that during rotation of the ball valve between its opened and closed positions that the center of the ball valve remains coaxial with the fitting axis. This relationship is maintained by the engagement of the valve seat and collar spherical surfaces 66 and 80, respectively, with the exterior of the ball valve, and yet no binding occurs in that the pivot pins 54 are capable of lateral radial displacement within the groove 32 as is necessary to accommodate the pivot pin movement during ball valve rotation. Thus, during ball valve operation the pivot pin will both rotate and be slightly laterally radially displaced within the groove.

It will be appreciated that the aforedescribed structure provides a self-sealing fitting utilizing a ball valve wherein movement of the ball valve between open and closed conditions is solely determined by axial forces and displacements occurring within the fitting and no external valve operator is required. Modifications to the inventive concepts may be apparent to those skilled in the art without departing from the spirit and scope of the invention.

I claim:

1. A conduit fitting utilizing a ball valve comprising, in combination, a body having a passage defined therein having a longitudinal axis, a ball valve within said passage having a spherical surface, a center and a bore defined within said ball valve extending therethrough having a longitudinal axis, an annular valve seat within said passage sealing engaging said ball valve spherical surface, means supporting said valve seat for axial displacement within said passage, stop means defined in said body passage limiting axial displacement of said valve seat within said passage, biasing means within said passage axially biasing said ball valve into sealing engagement with said valve seat and said valve seat toward said stop means, a pivot fixed upon said ball valve having an axis offset with respect to said ball valve center and transverse and offset with respect to said ball valve bore axis, and pivot retaining means defined upon said body maintaining the axis of said pivot transversely disposed to said passage axis preventing axial displacement of said pivot within said passage and permitting lateral radial displacement of said pivot whereby axial displacement of said ball valve and valve seat within said body passage rotates said ball valve about its center relative to said valve seat selectively establishing communication between said valve seat and ball valve bore to open and close said passage to fluid flow.

2. In a conduit fitting as in claim 1, wherein said pivot retaining means comprises an annular groove defined in said body passage concentric thereto and perpendicular to said passage axis, said pivot being received within said groove.

3. A conduit fitting utilizing a ball valve comprising, in combination, a body having a passage defined therein having a longitudinal axis, a ball valve within said passage having a spherical surface, a center and a diametrical cylindrical bore having a diameter substantially equal to the diameter of said passage, an annular valve seat axially displaceable within said passage between first and second positions having an annular first seal engaging said ball valve spherical surface and a second seal engaging said passage, stop means defined in said body passage limiting axial displacement of said valve seat within said passage, an annular collar axially displaceable within said passage engaging said ball valve on the opposite side of said center thereof with respect to said valve seat, a spring within said passage biasing said collar into engagement with said ball valve and biasing said ball valve toward said valve seat and said stop means, a pivot fixed on said ball valve having an axis offset with respect to said center and transverse and offset with respect to said ball valve bore, an annular groove defined within said body passage concentric thereto, said pivot being received within said groove for rotation and lateral radial displacement therein and restrained against displacement in the axial direction of said passage, axial movement of said valve seat within said passage in the direction of said collar pivoting said ball valve to align said valve bore with respect to said passage and valve seat opening said passage to flow at said first position of said valve seat, and axial movement of said valve seat within said bore toward said stop means to said second position pivoting said ball valve to transversely align said valve bore with said passage and valve seat to close said passage to flow.

4. In a conduit fitting as in claim 3, a concentric cylindrical surface defined in said passage engaged by said second seal.

5. In a conduit fitting as in claim 3, said stop means comprising a radial shoulder adjacent said cylindrical surface.

6. In a conduit fitting as in claim 3, said spring comprising a compression spring.

7. In a conduit fitting as in claim 3, said ball valve pivot having an axis perpendicular to the axis of the bore of said ball valve and lying in a plane transverse to the bore axis and intersecting the bore axis at a 45° included angle.

* * * * *